(12) United States Patent
Cui et al.

(10) Patent No.: US 10,509,985 B2
(45) Date of Patent: Dec. 17, 2019

(54) METHOD AND APPARATUS FOR SECURITY INSPECTION

(71) Applicant: Nuctech Company Limited, Beijing (CN)

(72) Inventors: Jin Cui, Beijing (CN); Huabin Tan, Beijing (CN); Shenglian Zhou, Beijing (CN); Zhi Peng, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 34 days.

(21) Appl. No.: 15/819,559

(22) Filed: Nov. 21, 2017

(65) Prior Publication Data

US 2018/0181834 A1    Jun. 28, 2018

(30) Foreign Application Priority Data

Dec. 23, 2016   (CN) .......................... 2016 1 1209378

(51) Int. Cl.
| | |
|---|---|
| *G06K 9/00* | (2006.01) |
| *G06K 9/62* | (2006.01) |
| *G06Q 50/26* | (2012.01) |
| *G06N 20/00* | (2019.01) |

(52) U.S. Cl.
CPC ....... *G06K 9/6215* (2013.01); *G06K 9/00255* (2013.01); *G06K 9/00288* (2013.01); *G06K 9/6262* (2013.01); *G06K 9/6277* (2013.01); *G06Q 50/265* (2013.01); *G06N 20/00* (2019.01)

(58) Field of Classification Search
CPC ............. G06K 9/6215; G06K 9/00255; G06K 9/00288; G06K 9/6262; G06K 9/6277; G06N 20/00
See application file for complete search history.

(56) References Cited

U.S. PATENT DOCUMENTS

| | | | | |
|---|---|---|---|---|
| 6,219,640 | B1 * | 4/2001 | Basu ................... | G06K 9/00221 704/231 |
| 8,135,220 | B2 * | 3/2012 | Kim .................... | G06K 9/00295 382/103 |
| 8,374,983 | B1 * | 2/2013 | Pohl ...................... | G06F 16/954 706/46 |
| 9,083,704 | B2 * | 7/2015 | Grossemy .............. | G06F 21/31 |
| 9,481,197 | B2 * | 11/2016 | Eckel ..................... | G06F 21/32 |
| 10,037,460 | B2 * | 7/2018 | Eckel ..................... | G06F 21/32 |
| 2002/0198731 | A1 * | 12/2002 | Barnes ................. | G06Q 50/265 705/325 |
| 2016/0269379 | A1 * | 9/2016 | Livesay ............. | G06K 9/00288 |
| 2018/0181834 | A1 * | 6/2018 | Cui .................... | G06K 9/00255 |

* cited by examiner

*Primary Examiner* — Gregory M Desire
(74) *Attorney, Agent, or Firm* — Scully Scott Murphy & Presser, P.C.

(57) ABSTRACT

Disclosed in the present disclosure are a method and an apparatus for security inspection. The method comprises: acquiring identity related information of a person being inspected, the identity related information comprising a certificate photo; acquiring a real-time facial image of the person being inspected; by comparing the real-time facial image and the certificate photo, acquiring a facial comparison similarity; dynamically determining the threshold of the facial comparison similarity; and performing a human-certificate verification on the person being inspected according to the facial comparison similarity and the threshold. The method for security inspection of the present disclosure enables the fast and accurate facial comparison of the person being inspected during security inspection.

10 Claims, 4 Drawing Sheets

METHOD AND APPARATUS FOR SECURITY INSPECTION

CROSS REFERENCE TO RELATED APPLICATION

The present application is based upon and claims priority to Chinese Patent Application No. 201611209378.8, filed on Dec. 23, 2016, and the entire contents thereof are incorporated herein by reference.

TECHNICAL FIELD

The disclosure relates to the field of large data information processing, and in particular, to a method and an apparatus for security inspection.

BACKGROUND

Security inspection in key locations is an important protective measure to guarantee the safety of passengers. Key locations for security inspection may comprise borders, customs, subways, stations and so on. As security inspection is an important protective measure to guarantee the safety of passengers, all the passengers to enter a key location must go through inspection before they are allowed to enter, without exception. Security inspection is also an inspection procedure passengers must go through.

Currently, during security inspection in public places such as roads, railway stations, airports and so on, the security staff verify the identity of a person being inspected mainly by inspecting the identity card and other documents. At present, the commonly used method is to verify the identity of the person being inspected using a human-certificate verification gate machine. The human-certificate verification gate machine collects a facial image by means of a camera on the equipment, and compares same to the photo in the certificated held by the person being inspected to achieve human-certificate verification. However, in the actual operation, during the comparison of the facial image of the person being inspected taken by the on site camera to the photo in the certificate of the person being inspected, there often appears the situation that the human-certificate comparison takes too long time and the comparison shall be performed a lot of times. Sometimes, the comparison even may fail and the verification has to be performed by human. More serious is that during the human-certificate verification, misrecognition phenomena sometimes might appear in the verification results, that is, the person being inspected can pass the verification using someone else's identity card. The current human-certificate recognition is difficult, the examination takes a long time, and passengers have poor security inspection experience. In addition, there are further misrecognition phenomena, resulting in large security risk.

Accordingly, there is a need for a new method and apparatus for security inspection.

The above-mentioned information disclosed in the background section is only for the purpose of enhancing the understanding of the background of the present disclosure and may therefore comprise information that does not constitute prior art known to those of ordinary skill in the art.

SUMMARY

In view of the above, the present disclosure provides a method and an apparatus for security inspection, enabling the fast and accurate facial comparison of a person being inspected in security inspection.

Other characteristics and advantages of the present disclosure will become apparent from the following detailed description, or will be learned, in part, by practice of the present disclosure.

According to an aspect of the present disclosure, there is provided a method for security inspection, comprising: acquiring identity related information of a person being inspected, the identity related information comprising a certificate photo; acquiring a real-time facial image of the person being inspected; by comparing the real-time facial image and the certificate photo, acquiring a facial comparison similarity; dynamically determining the threshold of the facial comparison similarity; and performing a human-certificate verification on the person being inspected according to the facial comparison similarity and the threshold.

In an exemplary embodiment of the present disclosure, the method further comprises: generating a dynamic threshold model from data of historical human-certificate verification, the dynamic threshold model being configured to acquire the threshold of the facial comparison similarity.

In an exemplary embodiment of the present disclosure, the identity related information comprises certificate number, gender, nationality, date of birth, residential address, and length of time of certificate handling.

In an exemplary embodiment of the present disclosure, dynamically determining the threshold of the facial comparison similarity comprises: dynamically determining the threshold of the facial comparison similarity through the dynamic threshold model.

In an exemplary embodiment of the present disclosure, generating a dynamic threshold model from data of historical human-certificate verification comprises: acquiring data of historical human-certificate verification; marking data of historical human-certificate verification according to the actual human-certificate verification result; and storing the data of historical human-certificate verification and the marked entry in the data of historical human-certificate verification into a sample library.

In an exemplary embodiment of the present disclosure, the method further comprises: generating a first data set from the sample library by means of data cleaning; mining a first data set through a large data visualization analysis technology, acquiring facial comparison associated features; and extracting, from the sample library, data corresponding to the facial comparison associated feature, and generating a facial comparison associated feature library.

In an exemplary embodiment of the present disclosure, the method further comprises: mining the facial comparison associated feature library through a machine learning algorithm, and generating a facial comparison threshold model.

In an exemplary embodiment of the present disclosure, the large data visualization analysis technology is based on an ElasticSearch server and processes data of historical human-certificate verification.

In an exemplary embodiment of the present disclosure, the large data visualization analysis technology comprises a Kibana visualization interface framework.

In an exemplary embodiment of the present disclosure, the machine learning algorithm is implemented based on Spark Mllib.

According to an aspect of the present disclosure, there is provided an apparatus for security inspection, the apparatus comprising: a first receiving module configured to acquire identity related information of a person being inspected, the identity related information comprising a certificate photo; a second receiving module configured to acquire a real-time facial image of the person being inspected; a comparison module configured to, by comparing the real-time facial image and the certificate photo, acquire a facial comparison similarity; a calculation module configured to dynamically determine the threshold of the facial comparison similarity; and a human-certificate verification module configured to perform a human-certificate verification on the person being inspected according to the facial comparison similarity and the threshold.

In an exemplary embodiment of the present disclosure, the apparatus further comprises: a model generation module configured to generate a dynamic threshold model from data of historical human-certificate verification, the dynamic threshold model being configured to acquire the threshold of the facial comparison similarity.

The method and apparatus for security inspection according to the present disclosure enable the fast and accurate facial comparison of a person being inspected in security inspection.

It is to be understood that both the foregoing general description and the following detailed description are exemplary only and do not limit the present disclosure.

BRIEF DESCRIPTION OF THE DRAWINGS

The foregoing and other objects, features and advantages of the present disclosure will become more apparent from the following detailed description of exemplary embodiments with reference to the accompanying drawings. The drawings described below are merely some embodiments of the present disclosure, and other drawings may be obtained by those of ordinary skill in the art from these drawings without the need for inventive work.

DETAILED DESCRIPTION

Figure 1:
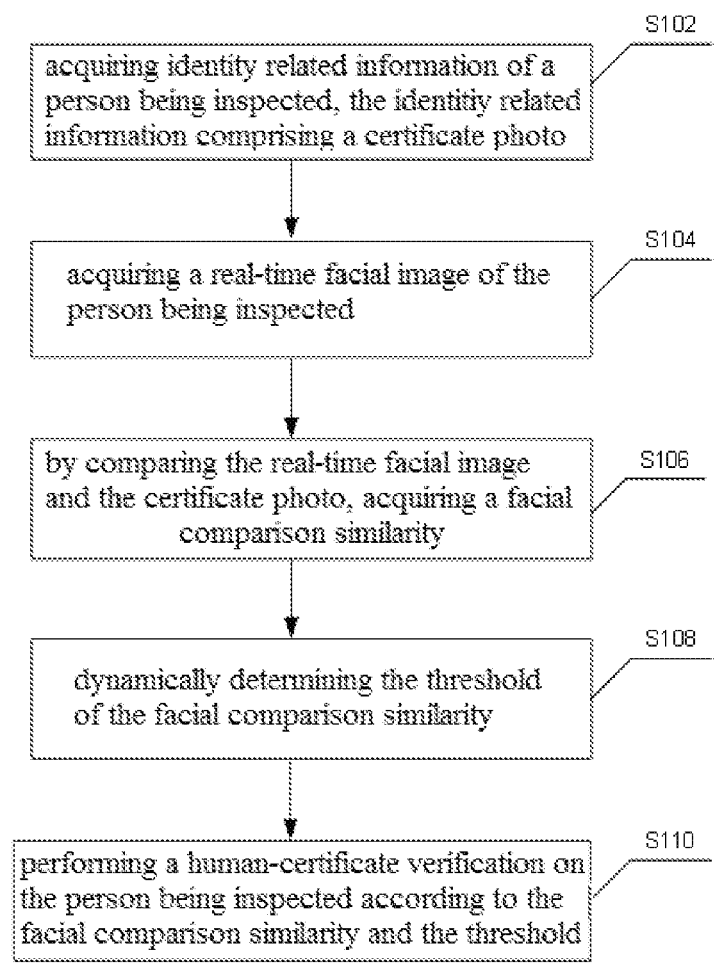
FIG. 1 is a flow chart of a method for security inspection according to an exemplary embodiment.

The exemplary embodiments will now be described more comprehensively with reference to the accompanying drawings. However, the exemplary embodiments can be embodied in a plurality of forms and should not be construed as being limited to the embodiments set forth herein; rather, these embodiments are provided so that the present disclosure will be thorough and complete, and the concepts of the exemplary embodiments will be fully conveyed to those skilled in the art. The same reference signs in the drawings denote the same or similar parts, and thus repeated description thereof will be omitted.

In addition, the features, structures, or characteristics described may be combined in one or more embodiments in any suitable manner. In the following description, numerous specific details are set forth to provide a sufficient understanding of the embodiments of the present disclosure. However, those skilled in the art will appreciate that the technical solutions of the present disclosure may be practiced without one or more of particular details, or may be practiced using other methods, components, devices, steps and the like. In other instances, well-known methods, devices, implementations or operations are not shown or described in detail so as to avoid obscuring aspects of the present disclosure.

The block diagrams shown in the drawings are merely functional entities and do not necessarily have to correspond to physically separate entities. That is, these functional entities may be implemented in the form of software, or implemented in one or more hardware modules or integrated circuits, or implemented in different networks and/or processor devices and/or microcontroller devices.

The flowcharts shown in the drawings are merely illustrative and do not necessarily comprise all of the contents and operations/steps, nor must they be performed in the order described. For example, some operations/steps may also be decomposed, and some operations/steps may be combined or partially merged, so that the actual execution order may change according to the actual situation.

It is to be understood that although the terms, first, second, third, etc., may be used herein to describe various components, these components should not be limited by these terms. These terms are used to distinguish between one component and another component. Thus, a first component discussed below may be referred to as a second component without departing from the teachings of concepts of the present disclosure. As used herein, the term and/or comprises any one of the listed associated items and all combinations of one or more thereof.

It will be understood by those skilled in the art that the drawings are merely schematic diagrams of the exemplary embodiments and that the modules or processes in the drawings are not certainly necessary to the implementation of the present disclosure and are therefore not intended to limit the scope of the present disclosure.

FIG. 1 is a flow chart of a method for security inspection according to an exemplary embodiment.

As shown in FIG. 1, in S102, the identity related information of a person being inspected is acquired, the identity related information comprising a certificate photo. For example, in the process of security inspection, when a person being inspected passes through a human-certificate verification gate machine, the human-certificate verification gate machine reads the information of a certificate held by the person being inspected to acquire the identity related information of the person being inspected, and the certificate may be an identification card. Furthermore, for example, through an external information collection device, the information of the certificate of the person being inspected is read, to obtain identity related information of the person being inspected. The identity related information of the person being inspected comprises a certificate photo. For example, the identity related information comprises other related information like the certificate number, the age of the certificate holder, gender and the like. The present disclosure is not limited thereto.

In S104, the real-time facial image of the person being inspected is acquired. For example, in the process of security inspection, a camera is used to collect, in real time, a facial image of the person being inspected.

Facial recognition collection is a biometrics recognition technology for identity recognition based on human facial feature information. A series of related techniques for capturing an image or a video stream containing a human face using a camera or a camera device and automatically detecting and tracking the human face in the image so as to further perform facial recognition of the detected human face, are often called portrait recognition, facial recognition. Facial recognition mainly comprises four parts, namely: facial image collection and detection, facial image preprocessing, facial image feature extraction, matching and recognition. There are following categories of facial recognition algorithms, feature-based recognition algorithms, appearance-based recognition algorithms, template-based recognition algorithms, recognition algorithms using neural networks; illumination-based estimation model theories; optimized deformation statistics correction theories; original real-time feature recognition theories, etc. The present disclosure is not limited thereto.

In S106, the facial comparison similarity is acquired by comparing the real-time facial image with the certificate photo. For example, the facial comparison similarity is acquired through the Euclidean distance method, and the facial comparison similarity may further be acquired for example through haar (rectangular feature algorithm) and adaboost iterative algorithm. The present disclosure is not limited thereto.

In S108, the threshold of the facial comparison similarity is dynamically determined. According to the identity related information described above, the threshold of the facial comparison similarity of the person being inspected is dynamically calculated.

In the related art, the similarity is obtained through real-time facial comparison, while the determined threshold of the similarity is a fixed value, and the efficiency of the comparison is low due to factors such as the external condition and the environment. The external condition constraints and the environmental factor constraints can be for example, that illumination problem which is an old problem in machine vision, particularly in facial recognition. At present, even the best facial recognition system in the outdoor lighting environment has an increasingly declining recognition rate. Similar to the illumination problem, the posture problem is also technically difficult to solve in the current facial recognition research. The similarity determination in facial recognition is also subject to changes in personal information of the person being inspected. For example, with the change of age, the facial appearance of the person being inspected also changes, especially for youngsters, whose facial changes are more obvious. For different age groups, the similarity obtained through facial recognition algorithms is different, and the recognition rate obtained by the same threshold is also different. For persons being inspected of different nationalities and of different genders, due to the different facial features of different nationalities, during the facial recognition, the resulting facial recognition similarity is also very different, and then in the field of an accident, the difference between results of real-time facial comparison is also obvious. If a single threshold is used to perform facial comparison similarity comparison in the related art, the problems of large comparison errors and low recognition rate are likely to occur. In the embodiments of the present disclosure, according to the identity related information acquired hereinabove, through the identity related information of the person being inspected, a reasonable judgment threshold is dynamically calculated for the facial comparison similarity of the person being inspected. For example, if it is known through analysis that the facial comparison similarity of some nationality is basically distributed about 70%, and in the actual process of security inspection, if only consider the national factors of the person being inspected, the dynamically generated face comparison similarity threshold may be, for example, 70%. In other words, when the real-time facial image of the person being inspected of the nationality is compared to the image in the certificate photo in the, the obtained facial comparison similarity is 70%, then it can be considered that the human-certificate verification is passed. The present disclosure is not limited thereto.

In S110, the human-certificate verification of the person being inspected is performed through the facial comparison similarity and the threshold.

The method for security inspection of the present disclosure enables, by collecting the identity related information of the person being inspected and dynamically calculating the threshold of the facial comparison similarity of the person to be inspectioned, the fast and accurate facial recognition of the person being inspected in the process of security inspection.

It is to be clearly understood that the present disclosure describes how specific examples are formed and used, but the principles of the present disclosure are not limited to any detail of these examples. In contrast, these principles can be applied to many other embodiments, based on the teachings of the contents of the present disclosure.

In an exemplary embodiment of the present disclosure, the determination of the facial comparison similarity may be, for example, divided into the following steps: 1. face detection to find the location of the human face in the image, for example, using haar (rectangle feature algorithm) and adaboost iterative algorithm; 2, facial feature point positioning. The facial feature point comprises the eye center point and may further comprise contour feature points like the cheek. For example, eye positioning can be implemented using haar (rectangular feature algorithm) and adaboost iterative algorithm. For example, sequence comparison algorithm like ASM is used, ASM being an algorithm based on point distribution model (PDM). In PDM, the geometry of objects with similar appearance, such as human face, human hand, heart, lung, etc. can be represented by the coordinates of several key landmarks connected in series to form a shape vector; 3, human face geometry normalization to obtain a normalized human face region image from the positions of the facial feature points. This step is mainly to make the position of human face corresponding to pixels on different human faces consistent, which then can be comparable. This step can be regarded as a process of affine transformation of the image; 4, human face illumination normalization. Its main purpose is to overcome the impact of different lighting on the human face to improve the robustness of the algorithm on the lighting conditions; 5, feature extraction, which is often to integrate a plurality of features; 6, identification feature extraction, which is to map high-dimensional facial features to low-dimensional features with higher classification degree, for example, using PCA (principal component analysis algorithm)+LDA (linear projection analysis algorithm); 7, calculating the distance between the identified features of two faces, as a measure of similarity, for example, using the Euclidean distance algorithm.

In an exemplary embodiment of the present disclosure, identity related information comprises certificate number, gender, nationality, date of birth, residential address, and length of time for certificate handling.

In an exemplary embodiment of the present disclosure, the method further comprises: generating a dynamic threshold model from data of historical human-certificate verification, the dynamic threshold model being used for obtaining the threshold of the facial comparison similarity. The threshold of the facial comparison similarity is dynamically determined through the dynamic threshold model.

Figure 2:
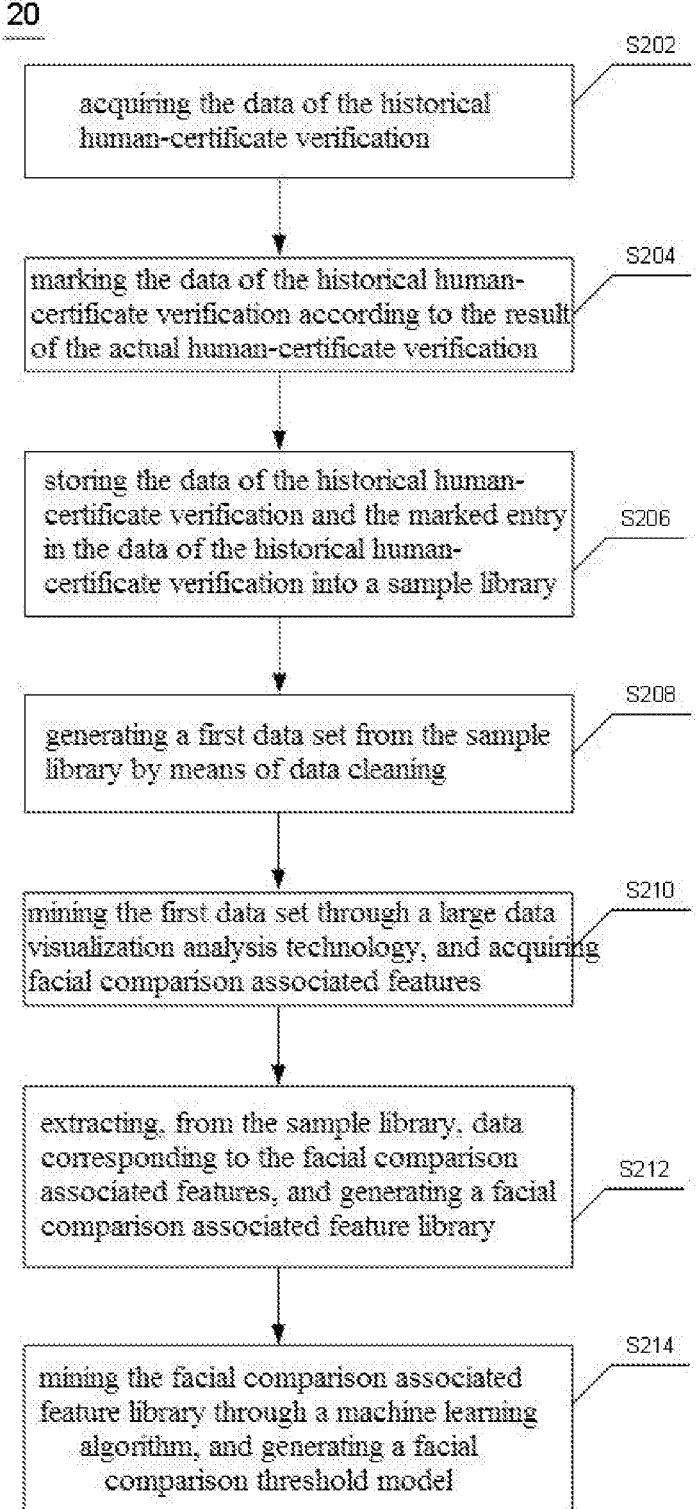
FIG. 2 is a flow chart of a method for generating a dynamic threshold model according to another exemplary embodiment.

FIG. 2 is a flow chart of a method for generating a dynamic threshold model shown according to another exemplary embodiment.

In S202, data of historical human-certificate verification is acquired. The process of collecting human-certificate comparison records and identity attribute information may be for example that, by reading the ID card of the person being inspected, the human-certificate verification device reads from the ID card information the ID card number, gender, nationality, date of birth, residential address, length of time of certificate handling, etc.

In S204, data of historical human-certificate verification is marked according to the actual human-certificate verification result. A facial image is collected by a human-certificate verification camera and is compared to the photo in the ID card held by the person being inspected, to obtain a facial comparison similarity through a facial comparison similarity comparison algorithm. The exemplary description of the facial comparison similarity comparison algorithm is as described above, and will not be repeated herein. If, in this historical information, the recognition result of the facial comparison similarity indicates recognition failure or error, this information is manually marked. The manually marked content may be, for example, the result of the final artificial facial recognition, and the like. The present disclosure is not limited thereto. The above information is aggregated and processed to generate facial comparison related information of the person being inspected who has been historically human-certificated verified.

In S206, the data of historical human-certificate verification and the marked entry in the data of historical human-certificate verification are stored into a sample library. The information above and the result of the information recognition are stored into the sample library.

In S208, the sample library is subjected to data cleaning to generate a first data set. The data in the sample library is subjected to data cleaning, for example, data information of a predetermined format is obtained after data cleaning, and a first data set is generated from the data information of the predetermined format. Data cleansing is a process of re-examining and verifying data, with the aim of deleting duplicate information, correcting existing errors, and providing data consistency. For example, ETL data cleaning technology is used. ETL data cleaning is the process of data extraction, data transforming and data loading. Data extraction is responsible for completing the finding of, from the data source, and extraction of part of data required by the current subject matter, and since data in various subject matter in a database are stored according to the requirements of current front-end applications, the extracted data need to be transformed to adapt to the needs of the front-end applications. The transformed data can be loaded into the database. The data loading process is performed at regular intervals, and data loading tasks of different subject matter have their own different execution schedules. ETL data cleaning is an important part of building a database. Database is a subject matter-oriented, integrated, stable, and time-varying data set to support the decision making process in business management. Database is mainly used for decision analysis, and providing decision support information to leaders. There may be a lot of "dirty data" in a database system. The main causes of "dirty data" are abuse of abbreviations and idioms, data input errors, duplicate records, lost values, spelling changes, different units of measure, and outdated coding and so on. To clear "dirty data", data cleaning must be performed in the database system. Data cleaning is a process of reducing errors and inconsistencies and addressing object recognition.

In S210, the first data set is mined through large data visualization analysis technology to obtain facial comparison associated features. Large data visualization analysis technology may be, for example, to process data of historical human-certificate verification based on ElasticSearch search server. ElasticSearch is a Lucene-based search server that supports distributed multi-user concurrent large data full-text search engines. The technology is used for large data analysis, and can achieve stable, reliable and fast real-time search. Using the ElasticSearch technology, the system can quickly process and retrieve on mass human-certificate comparison records and person factor information. The large data visualization analysis technology can comprise, for example, Kibana visual interface framework. By means of the large data visualization analysis technology, a variety of charts and other visual analysis may be performed on the first data set to obtain facial comparison associated features. Kibana is a visual interface framework that supports large data analysis and querying, enabling dynamic generation of various visual interfaces such as charts. Using Kibana technology, the technician can use a variety of visual graphs to flexibly analyze the association and correlation relationship between person factors and the facial comparison similarity.

In S212, the data corresponding to the facial comparison associated feature is extracted from the sample library to generate facial comparison associated feature library.

In S214, the facial comparison associated feature library is mined through a machine learning algorithm to generate a facial comparison threshold model. For example, the machine learning algorithm is to perform machine learning training on the feature library based on Spark Mllib implementation to generate facial comparison dynamic threshold model. Mllib can be divided into four parts: MLlib, MLI, ML Optimizer and MLRuntime. Wherein, ML Optimizer selects the machine learning algorithm and associated parameters that it has considered to be the best and have been implemented therein, to process user inputted data and return the model or the results of other helpful analysis; MLI is an algorithm-implemented API or platform that performs feature extraction and advanced ML programming abstraction; MLlib is that Spark implements some common machine learning algorithm and utilities, comprising classification, regression, clustering, collaborative filtering, reduced dimension and underlying optimization, and the algorithm can be scalable; MLRuntime is based on the Spark framework and applies Spark's distributed computing to machine learning. The facial comparison associated feature library is mined through the machine learning algorithm to generate the facial comparison threshold model.

By generating a facial comparison threshold model through large data related data analysis technology, the method for security inspection of the present disclosure enables the accurate determination of the threshold of the facial comparison similarity according to the identity related information of the person being inspected in the process of security inspection.

Figure 3:
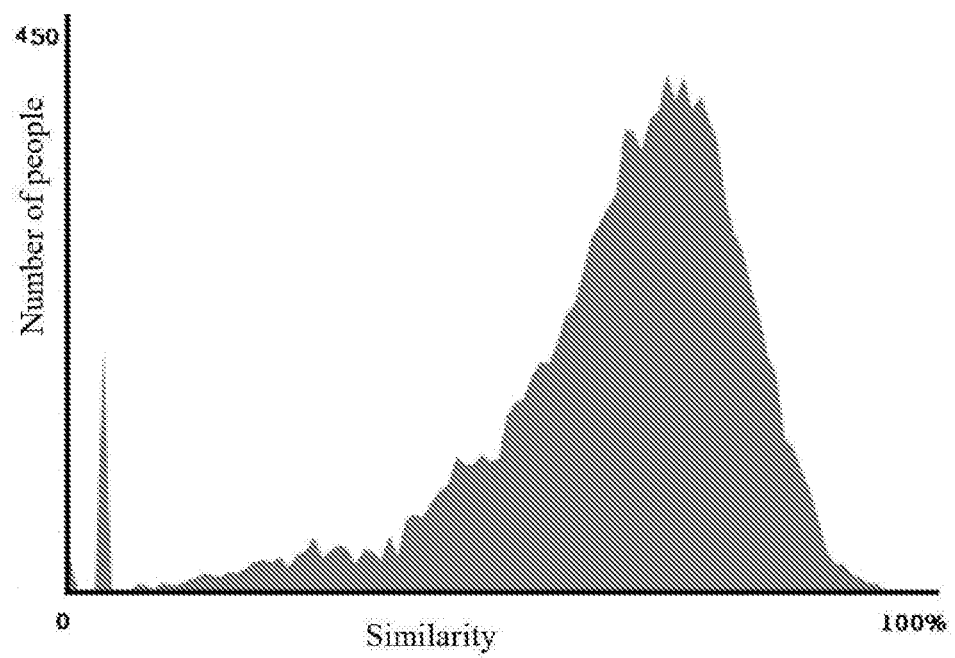
FIG. 3 is a schematic diagram of facial comparison similarity associated features of some nationality shown in according to another exemplary embodiment.

FIG. 3 is a schematic diagram of a similarity associated feature of some nationality in the method for security inspection shown according to another exemplary embodiment.

As shown in FIG. 3, it can be seen through analysis that the facial comparison similarity of the nationality is basically distributed about 70%. In the actual process of security inspection, if only the nationality factor of the person being inspected is considered, the dynamically generated facial comparison similarity threshold is about 70%. In other words, when the real-time facial image of the person being inspected of the nationality is compared to the image in the certificate photo, if the obtained facial comparison similarity is 70%, it could be considered that the human-certificate verification is passed. It further may be for example that the facial comparison similarity of another nationality is basically distributed 80%, and if only the nationality factor is considered, then when the real-time facial image of the person being inspected of the nationality is compared to the image in the certificate photo, if the obtained real-time facial comparison similarity is 70%, that it can be considered that the human-certificate verification is not passed.

In a facial comparison algorithm, usually a classifier or a simpler cosine distance, L2 distance is used for score determination, and then a fixed threshold is used to determine whether it is the same person. This has certain limitations, a different age, a different time of collection of a certificate, a different race, a different gender and other human identity attributes will lead to a difference in the trained model. Among a large number of people in public places such as highway security inspection stations, the use of a unified threshold will lead to an increase in error acceptance rate and error rejection rate in the case where facial attributes are different. Therefore, training different thresholds based on the human identity attributes helps to improve the human facial recognition performance. In the embodiment of the present disclosure, various factors influencing the threshold of the facial comparison similarity, such as age and gender, are fully considered, and the relationship between the factors is analyzed through the large data analysis method. It may also be for example that, according to different influences on the final facial comparison similarity from the factors described above, the corresponding weights between the different factors and the facial comparison similarity threshold are dynamically allocated, to comprehensively provide the facial comparison threshold of the person being inspected.

Those skilled in the art will appreciate that all or part of the steps to implement the above embodiments are implemented as a computer program executed by CPU. When the computer program is executed by CPU, the above-described functions defined by the above-described method provided by the present disclosure are executed. The program may be stored in a computer-readable storage medium, which may be a read-only memory, a magnetic disk, an optical disk, or the like.

In addition, it is to be noted that the above drawings are only illustrative of the processes comprised in the method according to the exemplary embodiments of the present disclosure and are not intended to be limiting. It is easy to understand that these processes shown in the above drawings do not indicate or limit the chronological order of these processes. In addition, it is also easy to understand that these processes may be, for example, performed synchronously or asynchronously in a plurality of modules.

The following is an embodiment of the apparatus of the present disclosure, which can be used to carry out the method embodiment of the present disclosure. For the details that are not disclosed in the embodiment of the apparatus of the present disclosure, reference is made to the method embodiments of the present disclosure.

Figure 4:
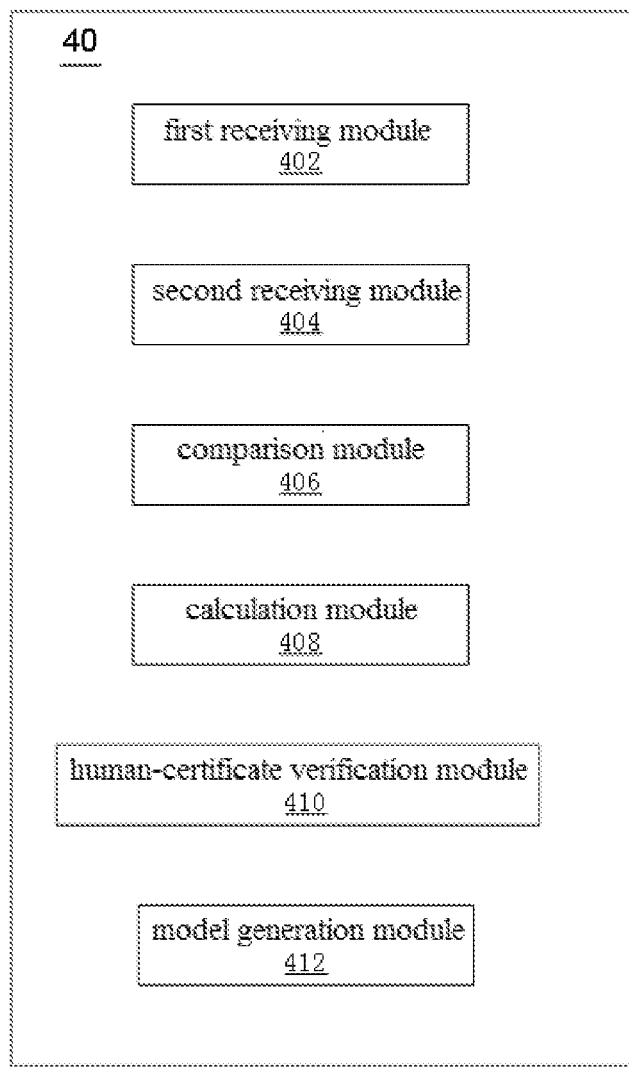
FIG. 4 is a block diagram of an apparatus for security inspection according to an exemplary embodiment.

FIG. 4 is a block diagram of an apparatus for security inspection according to an exemplary embodiment.

Wherein, a first receiving module 402 is configured to acquire identity related information of a person being inspected, the identity related information comprising a certificate photo.

A second receiving module 404 is configured to acquire a real-time facial image of the person being inspected.

A comparison module 406 is configured to acquire, by comparing the real-time facial image and the certificate photo, a facial comparison similarity.

A calculation module 408 is configured to dynamically determine the threshold of the facial comparison similarity.

A human-certificate verification module 410 is configured to perform a human-certificate verification on the person being inspected according to the facial comparison similarity and the threshold.

A model generation module 412 is configured to generate, by means of data of historical human-certificate verification, a dynamic threshold model for obtaining the threshold of the facial comparison similarity.

The apparatus for security inspection of the present disclosure enables, by collecting the identity related information of the person being inspected and dynamically calculating the threshold of the facial comparison similarity of the person being inspected, the accurate determination of facial recognition of the person being inspected in the process of security inspection.

It will be understood by those skilled in the art that the above-described modules may be distributed in devices according to the description of the embodiments, and may also be modified in a corresponding manner different from one or more devices of the present embodiments. The modules of the above embodiments may be combined into one module and may also be further split into a plurality of submodules.

With the description of the embodiments hereinabove, it will be readily understood by those skilled in the art that the exemplary embodiments described herein may be implemented by software, and may also be implemented by software in conjunction with necessary hardware. Thus, the technical solution according to the embodiments of the present disclosure may be embodied in the form of a software product which may be stored on a nonvolatile storage medium (which may be a CD-ROM, a U disk, a mobile hard disk, etc.) or on a network, and comprises a number of instructions to enable a computing device (which may be a personal computer, a server, a mobile terminal, or a network device, etc.) to perform the method according to the embodiments of the present disclosure.

With the foregoing detailed description, it will be readily understood by those skilled in the art that the method and apparatus for security inspection according to the embodiments of the present disclosure have one or more of the following advantages.

According to some embodiments, the method for security inspection of the present disclosure enables the fast and accurate facial recognition of the person being inspected in the process of security inspection, by collecting the identity related information of the person being inspected and dynamically calculating the threshold of the facial comparison similarity of the person being inspected.

According to other embodiments, the method for security inspection of the present disclosure enables, through large data related data analysis technology, the accurate determination of the threshold of the facial comparison similarity according to the identity related information of the person being inspected in the process of security inspection, by generating a facial comparison threshold model.

The exemplary embodiments of the present disclosure have been specifically shown and described above. It is to be understood that the present disclosure is not limited to the detailed structure, arrangement, or method of implementation described herein; rather, the present disclosure is intended to cover various modifications and equivalent arrangements included within the spirit and scope of the appended claims.

In addition, the structure, proportion, size, etc. shown in the drawings of the description are merely illustrative of the content disclosed in the description, for those skilled in the art to understand and read the present disclosure, and are not intended for defining the the implementation of the present disclosure, thereby having no essential technical meaning. Any modification in structure, change in proportion or adjustment in size shall fall within the range covered by the technical content of the present disclosure without influencing the technical effect produced by the present disclosure and the object that can be achieved. Meanwhile, the terms such as "above", "first", "second" and "a/an" in the description, are merely illustrative and are not intended to limit the scope of the present disclosure, and the change or adjustment in relative relation shall also be considered to be within the range of implementation of the present disclosure, without substantial modification in the technical contents.

The invention claimed is:

1. A method for security inspection, comprising:
   acquiring identity related information of a person being inspected, the identity related information comprising a certificate photo;
   acquiring a real-time facial image of the person being inspected;
   by comparing the real-time facial image and the certificate photo, acquiring a facial comparison similarity;
   generating a dynamic threshold model from data of historical human-certificate verification, the dynamic threshold model being configured to acquire a threshold of the facial comparison similarity;
   dynamically determining the threshold of the facial comparison similarity; and
   performing a human-certificate verification on the person being inspected according to the facial comparison similarity and the threshold,
   wherein the generating a dynamic threshold model from data of historical human-certificate verification comprises:
      acquiring the data of the historical human-certificate verification;
      marking the data of the historical human-certificate verification according to the result of the actual human-certificate verification; and
      storing the data of the historical human-certificate verification and the marked entry in the data of the historical human-certificate verification into a sample library.

2. The method according to claim 1, wherein the identity related information further comprises certificate number, gender, nationality, date of birth, residential address, and length of time of certificate handling.

3. The method according to claim 1, wherein dynamically determining the threshold of the facial comparison similarity comprises:
   dynamically determining the threshold of the facial comparison similarity through the dynamic threshold model.

4. The method according to claim 1, further comprising:
   generating a first data set from the sample library by means of data cleaning;
   mining the first data set through a large data visualization analysis technology, and acquiring facial comparison associated features; and
   extracting, from the sample library, data corresponding to the facial comparison associated features, and generating a facial comparison associated feature library.

5. The method according to claim 4, further comprising:
   mining the facial comparison associated feature library through a machine learning algorithm, and generating a facial comparison threshold model.

6. The method according to claim 5, wherein the machine learning algorithm is implemented based on Spark Mllib.

7. The method according to claim 4, wherein the large data visualization analysis technology is based on an ElasticSearch server and processes the data of the historical human-certificate verification.

8. The method according to claim 4, wherein the large data visualization analysis technology comprises a Kibana visualization interface framework.

9. An apparatus for security inspection, comprising:
   a processor; and
   a memory for storing instructions executable by the processor;
   wherein the processor is configured to:
      acquire identity related information of a person being inspected, the identity related information comprising a certificate photo;
      acquire a real-time facial image of the person being inspected;
      acquire, by comparing the real-time facial image and the certificate photo, a facial comparison similarity;
      generate a dynamic threshold model from data of historical human-certificate verification, the dynamic threshold model being configured to acquire the threshold of the facial comparison similarity;
      dynamically determine the threshold of the facial comparison similarity; and
      perform a human-certificate verification on the person being inspected according to the facial comparison similarity and the threshold,
   wherein the processor configured to generate a dynamic threshold model from data of historical human-certificate verification is configured to:
      acquire the data of the historical human-certificate verification;
      mark the data of the historical human-certificate verification according to the result of the actual human-certificate verification; and
      store the data of the historical human-certificate verification and the marked entry in the data of the historical human-certificate verification into a sample library.

10. A non-transitory computer-readable storage medium storing instructions which, when executed by a processor, cause the processor to perform a method comprising:
    acquiring identity related information of a person to be checked, the identity related information comprising a certificate photo;
    acquiring a real-time facial image of the checked person;
    by comparing the real-time facial image and the certificate photo, acquiring a facial comparison similarity;
    generating a dynamic threshold model from data of historical human-certificate verification the dynamic threshold model being configured to acquire a threshold of the facial comparison similarity;

dynamically determining the threshold of the facial comparison similarity; and performing a human-certificate verification on the checked person according to the facial comparison similarity and the threshold, wherein the generating a dynamic threshold model from data of historical human-certificate verification comprises:

acquiring the data of the historical human-certificate verification;

marking the data of the historical human-certificate verification according to the result of the actual human-certificate verification; and storing the data of the historical human-certificate verification and the marked entry in the data of the historical human-certificate verification into a sample library.

* * * * *